United States Patent [19]
Mashino et al.

[11] Patent Number: 5,886,759
[45] Date of Patent: *Mar. 23, 1999

[54] LIQUID CRYSTAL DISPLAY DEVICE HAVING A SIDE EDGE TYPE BACK LIGHT SYSTEM WITH A HUE LAYER IN THE VICINITY OF THE LIGHT SOURCE

[75] Inventors: Naohiro Mashino; Hisao Hirayama, both of Mobara, Japan

[73] Assignees: Hitachi, Ltd., Tokyo; Hitachi Electronic Devices Co. Ltd., Mobara, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 611,635

[22] Filed: Mar. 6, 1996

[30] Foreign Application Priority Data

Mar. 6, 1995 [JP] Japan ................................ 7-045348

[51] Int. Cl.⁶ .................. G02F 1/1335; G01D 11/28; F21V 7/04
[52] U.S. Cl. ........................ 349/65; 349/64; 349/113; 362/26; 362/31
[58] Field of Search ................. 349/64, 65, 67, 349/70, 61, 62, 113; 362/26, 31, 32, 29, 30, 260, 310, 277

[56] References Cited

U.S. PATENT DOCUMENTS

| | | | |
|---|---|---|---|
| 5,714,247 | 2/1998 | Kuo et al. | 428/323 |
| 5,739,889 | 4/1998 | Yamada et al. | 349/156 |
| 5,764,322 | 6/1998 | Mamiya et al. | 349/65 |

FOREIGN PATENT DOCUMENTS

| | | |
|---|---|---|
| 62-154422 | 9/1987 | Japan . |
| 3-9304 | 1/1991 | Japan . |
| 4-355429 | 12/1992 | Japan . |
| 5-134116 | 5/1993 | Japan . |
| 5-50433 | 7/1993 | Japan . |
| 5-64801 | 8/1993 | Japan . |
| 6-4706 | 1/1994 | Japan . |
| 6-160848 | 6/1994 | Japan . |
| 6-347788 | 12/1994 | Japan . |

Primary Examiner—William L. Sikes
Assistant Examiner—Tiep H. Nguyen
Attorney, Agent, or Firm—Antonelli, Terry, Stout & Kraus, LLP

[57] ABSTRACT

In order to provide a liquid crystal display (LCD) device capable of improving the display quality by preventing light leakage in the end portion of a display window on the side adjacent a fluorescent tube, a liquid crystal display device has a LCD panel, a light guide placed under the LCD panel, a fluorescent tube placed close to and along at least one side of the light guide, a lamp reflector sheet for covering substantially the whole length of the fluorescent tube, a diffusion sheet placed on the light guide under the LCD panel, and a reflective sheet placed under the light guide, wherein the surface of the lamp reflector sheet, reflective sheet or the diffusion sheet on the one side of the light guide is printed in color.

10 Claims, 11 Drawing Sheets

LIQUID CRYSTAL DISPLAY DEVICE HAVING A SIDE EDGE TYPE BACK LIGHT SYSTEM WITH A HUE LAYER IN THE VICINITY OF THE LIGHT SOURCE

BACKGROUND OF THE INVENTION

The present invention relates to a liquid crystal display (LCD) device. Especially, the present invention relates to a LCD device or unit having a LCD panel in which a so-called edge-light type back light system is employed, the back light system having a fluorescent tube placed close to and along one side of a light guide, and in which a lamp reflector is provided which extends almost the whole length of the fluorescent tube.

A liquid crystal display unit of the type mentioned above includes, for example, a liquid crystal display (i.e., a liquid crystal panel, LCD: Liquid Crystal Display), a back light mounted under the liquid crystal display for supplying light thereto, a liquid-crystal driving circuit board disposed outside the outer periphery of the liquid crystal display, a frame body in the form of a molded part for holding each of the above members, and a metal frame for accommodating these members, the metal frame being provided with a display window. The liquid crystal display is typically prepared by stacking two transparent glass substrates with a predetermined spacing in such a manner as to cause display pixel electrodes, formed with a transparent conductive film, to face an orientation film, sticking the two glass substrates together using a frame-shaped sealing material placed close to the peripheral edge between both substrates, feeding liquid crystals through a liquid crystal sealing port provided in part of the sealing material to enclose the liquid crystals in the sealing material between both substrates, and providing polarization plates outside the substrates.

The back light comprises, for example, a light guide formed of a transparent acrylic plastic plate for guiding the light emitted from a light source in a direction away from the light source for irradiating the whole liquid crystal display uniformly with light, a fluorescent tube placed close to, along and in parallel to one side of the light guide, a lamp reflector covering substantially the whole length of the fluorescent tube, the lamp reflector being substantially U-shaped in cross section and having an inner face which is colored white or silver, a diffusion sheet disposed on the light guide for diffusing the light from the light guide, and a reflective sheet for reflecting the light from the light guide toward the liquid crystal display.

Moreover, the light emitted from the fluorescent tube is introduced into the light guide where it is subjected to total reflection. In order to cause the light to be sent from the top surface of the light guide by means of diffused reflection, however, there is formed a pattern of a plurality of light diffusion dots printed with white ink on the bottom surface of the light guide, or well-regulated protrusions or recesses are incorporated in the bottom surface of the light guide.

Such conventional liquid crystal display units have been described in, for example, Japanese Patent Publication No. 19474/1985 and Japanese Utility Model Unexamined Publication No. 22780/1992.

FIG. 17A is a top view of a conventional liquid crystal display unit (module), and FIG. 17B is a top view of the latest liquid crystal display unit, wherein reference numeral 63 denotes a liquid crystal display module; 41 denotes a metal frame (i.e., shielding case); 80 denotes a display window; and 62 denotes a liquid crystal display.

FIG. 18 is a view of a fluorescent tube in combination with a light guide, wherein reference numeral 36 denotes a fluorescent tube; 37 denotes a light guide; 65 denotes a light-receiving edge face; and 81 denotes a light leakage zone.

SUMMARY OF THE INVENTION

In the case of the latest liquid crystal display unit, attempts have been made to provide a larger screen (i.e., a large-sized effective luminous area) and also to reduce the size of the display unit. Consequently, the tendency is for the so-called frame around the display window 80 to be narrowed (i.e, a reduction in the distance d1 of FIG. 17B). In view of this tendency, the distance d2 between the light-receiving edge face 65 of the light guide 37 and the outermost pixel (i.e., on the side of the fluorescent tube 36) of the liquid crystal display is largely reduced from, for example, a conventional spacing of 10~15 mm—several 10s mm to a spacing of 3.3 mm. In other words, the end portion of the display window 80 has been set extremely close to the fluorescent tube 36. Therefore, a problem arises in that light leakage (a bright line) may occur in the vicinity of the end portion of the display window 80, as shown by the light leakage zone 81 in FIG. 18.

An object of the present invention is to provide a liquid crystal display unit which is capable of improving the display quality by preventing light leakage in the end portion of a display window on the side of the fluorescent tube.

In order to accomplish this object, a liquid crystal display unit is provided which comprises a liquid crystal display, a light guide disposed under the liquid crystal display, a fluorescent tube mounted close to and along at least one side of the light guide, a lamp reflector covering substantially the whole length of the fluorescent tube, a diffusion sheet placed on the light guide under the liquid crystal display, and a reflective sheet placed under the light guide, wherein the surface of the reflective sheet on the one side of the light guide is printed in color.

Further, the undersurface of the end portion of the lamp reflector mounted on the surface of the light guide on the one side thereof is printed in color.

Further, the undersurface of the end portion of the lamp reflector mounted on the surface of the light guide on the one side thereof is provided with a colored tape at least on the light guide side via an adhesive layer.

Further, the undersurface of the diffusion sheet on the one side of the light guide is printed in color.

Further, the undersurface of the diffusion sheet on the one side of the light guide is provided with the colored tape at least on the light guide side via the adhesive layer.

Further, the diffusion sheet is not adhesion-bonded to the light guide or there exists an air layer between the diffusion sheet and the light guide.

Further, the end portion of the lamp reflector sheet is adhesion-bonded onto the end portion of the diffusion sheet on the one side of the light guide.

Further, one of gray, dark brown, purple, green and black colors is used for coloring purposes.

Further, the color printing to be conducted is in the form of dots.

Further, the dots are linearly arranged in a plurality of rows substantially in parallel with the direction of the major axis of the fluorescent tube. The center point of any one of the dots arranged in rows is located substantially halfway between the center points of dots in the adjacent row on either side, that is, the dots are preferably arranged in a zigzag pattern.

Further, the reflective sheet is not adhesion-bonded to the light guide or there exists an air layer between the light guide and the diffusion sheet.

Further, at least one lens sheet is placed between the diffusion sheet and the liquid crystal display.

According to the present invention, the surface of the reflective sheet on the side of the light-receiving edge face of the light guide, the undersurface of the lamp reflector mounted above the surface of the light guide, and the undersurface of the diffusion sheet on the side of the light-receiving edge face of the light guide are printed in color or have a colored tape pasted thereon so that excessive light causing light leakage may be absorbed by the section printed in color or the colored tape. Light leakage which could result in deterioration of the display quality on the screen near the fluorescent tube is thus prevented.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1A:
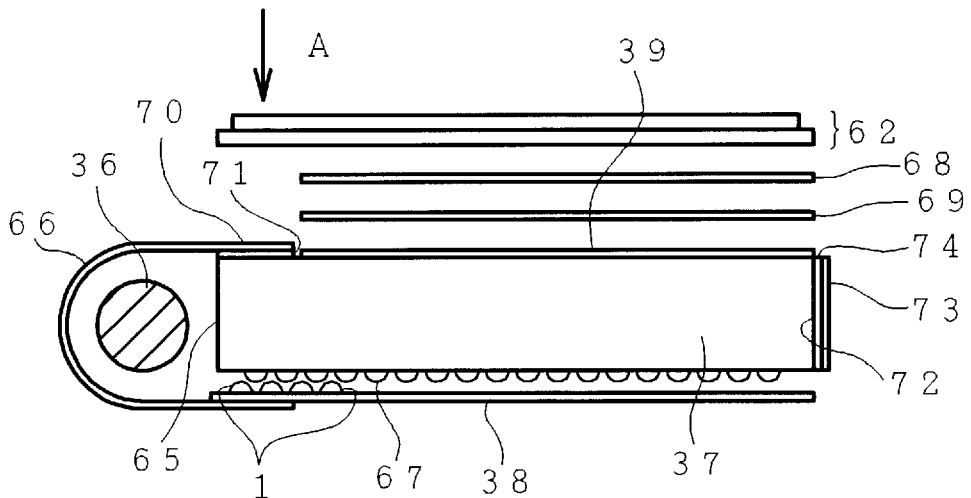
FIG. 1A is a side view showing a back light placed under a liquid crystal display according to a first embodiment of the present invention.
Figure 1B:
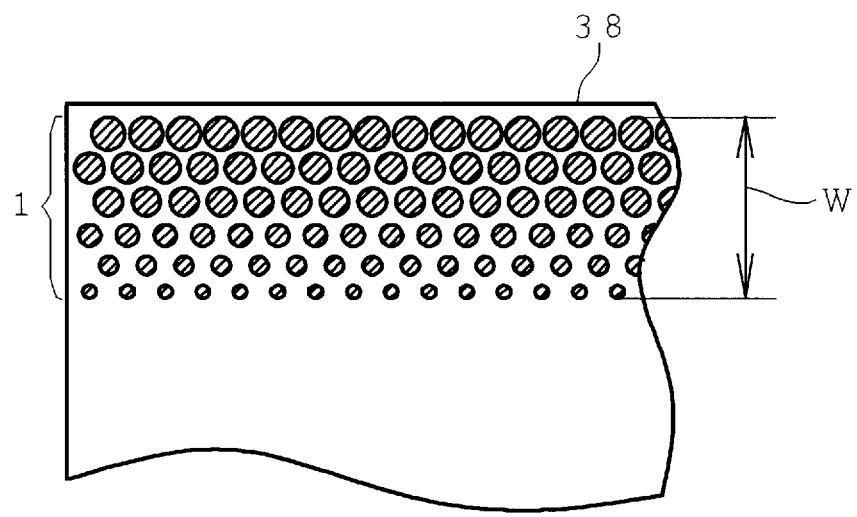
FIG. 1B is a top view of the principal part of a reflective sheet in the arrangement of FIG. 1A.

FIG. 1A is a side view showing a back light disposed under a liquid crystal display according to a first embodiment of the present invention, and FIG. 1B a top view of the principal part of a reflective sheet in the arrangement of FIG. 1A. Like reference characters are given to equal-functioning component parts in the following drawings and a repetitive description thereof will be omitted.

Reference numeral 62 denotes a liquid crystal display; 37 denotes a light guide positioned under the liquid crystal display 62; 65 denotes a light-receiving edge face as one side of the light guide 37; 36 denotes a fluorescent tube placed close to and along the light-receiving edge face 65; 66 denotes a lamp reflector sheet covering substantially the whole length of the fluorescent tube 36, the lamp reflector sheet being substantially U-shaped in cross section and having an inner face which is colored white or silver; 39 denotes a diffusion sheet located on the light guide 37 under the liquid crystal display 62; 38 denotes a reflective sheet located under the light guide 37; 67 denotes a pattern of a plurality of light diffusion dots printed with white ink on the underside of the light guide 37 for transmitting, from the top surface of the light guide 37, light introduced into the light guide 37 and subjected to total reflection; 68 and 69 denote lens sheets (lens films) placed between the diffusion sheet 39 and the liquid crystal display 62; 1 denotes a section printed with gray-colored dots on the surface of the reflective sheet 38 adjacent the light-receiving edge face 65 of the light guide 37; 70 denotes the end portion of the lamp reflector sheet 66; 71 denotes an adhesive layer for bonding the end portion 70 of the lamp reflector sheet 66 onto the surface of the light guide 37; 72 denotes the edge face opposite the light-receiving edge face 65; 73 denotes a reflective tape provided on the side 72; and 74 denotes an adhesive layer for bonding the reflective tape 73 to the edge face 72.

The reflective sheet 38 is not adhesive-bonded to the light guide 37, so that there exists an air layer between the light guide 37 and the reflective sheet 38. One end portion of the lamp reflector sheet 66 is adhesive-bonded via the adhesive layer 71 to the surface of the light guide 37. Although the other end portion of the lamp reflector sheet 66 is located beneath the reflective sheet 38, it is not adhesion-bonded thereto, but is held down by a frame or the like (not shown). The diffusion sheet 39 is also mounted on the light guide 37 without being adhesion-bonded thereto. Although the lens sheets 68, 69 and the liquid crystal display 62 are shown as elements which are spaced apart in FIG. 1A, the lens sheets 68, 69 are actually stacked up on the diffusion sheet 39 without being adhesion-bonded thereto, and the liquid crystal display 62 is mounted thereon. The inner face of the lamp reflector sheet 66 facing the fluorescent tube 36 is colored white or silver so that light is reflected from the inner face thereof toward the light-receiving edge face 65 of the light guide 37. Moreover, a reflective tape (not shown), similar to the reflective tape 73, is adhesion-bonded to both of the lamp reflector sheet sides perpendicular to the light-receiving edge face 65 of the light guide 37.

FIG. 1B is a diagram of the reflective sheet 38 of FIG. 1A as viewed in the direction of arrow A.

Figure 18:
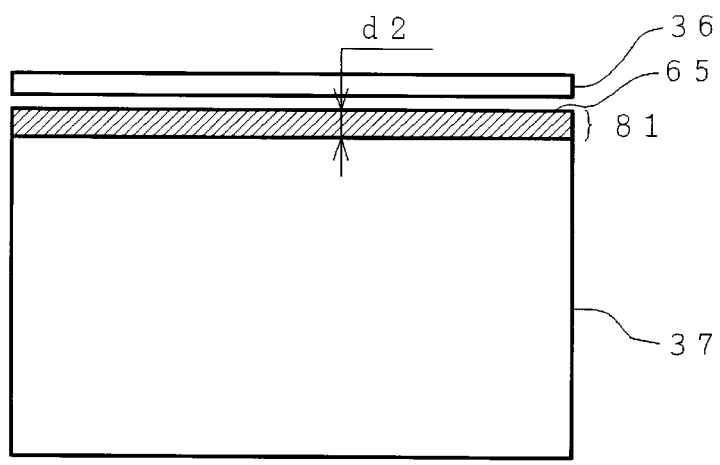
FIG. 18 is a view of a fluorescent tube in combination with a light guide and a light leakage zone.

According to the present invention, the provision of a layer in the section 1, in the form of colored dots printed on the surface of the reflective sheet 38 at the end adjacent the light-receiving edge face 65 of the light guide 37, as shown in FIG. 1, allows excessive light, which may tend to cause light leakage, to be absorbed by the section 1, thereby preventing light leakage, which could result in deterioration of the display quality on the screen close to the fluorescent tube 36 (see light leakage zone 81 in FIG. 18).

In the case of the latest liquid crystal display unit, an attempt has been made to increase the size of the screen simultaneously with decreasing the size of the display unit, and the tendency is for the so-called frame around the display window to be narrowed. In view of this tendency, the distance between the light-receiving edge face 65 of the light guide 37 and the outermost pixel (on the side of the fluorescent tube 36) of the liquid crystal display has been largely reduced from, for example, a conventional size of 10 mm–several 10s mm to a current size of 3.3 mm, that is, the end portion of the display window has been set extremely close to the fluorescent tube 36. Therefore, light leakage (see the light leakage zone 81 of FIG. 18) tends to occur in the vicinity of the end portion of the display window. The present invention is designed to readily solve this problem.

One of dark brown, purple and green colors in addition to gray, is usable in the section 1 as the color of the printed dots. In proportion to the condition and intensity of light leakage, the configuration, size, orientation, color tone, and color density of the dot pattern in the section 1 are controlled and optimized. According to Embodiment 1, the width w of the section 1 is 0.1–2 mm. Easy-to-print circular dots are used for the dot pattern and orientated in such a manner that the dots are linearly arranged in rows in the direction of the major axis of the fluorescent tube 36 with equal pitches (called a dot-in line pattern). Moreover, the dots orientated in the direction of the major axis of the fluorescent tube 36 are shifted from each other in terms of adjoining rows and positioned in a zigzag (called a zigzag or triangular arrangement: arranged in, for example, an equilateral or isosceles triangle). Further, the area of each dot is decreased in proportion to an increase in the distance from the fluorescent tube 36 so as to make the dots invisible on the screen.

If a colored tape (as will be described later with reference to FIG. 3) is pasted on the surface of the reflective sheet 38 at the end adjacent the light-receiving edge face 65 or if black dots are printed thereon, a blackish line will appear on the screen. This is undesirable because two diffusion sheets are required to negate such a line.

Figure 2:
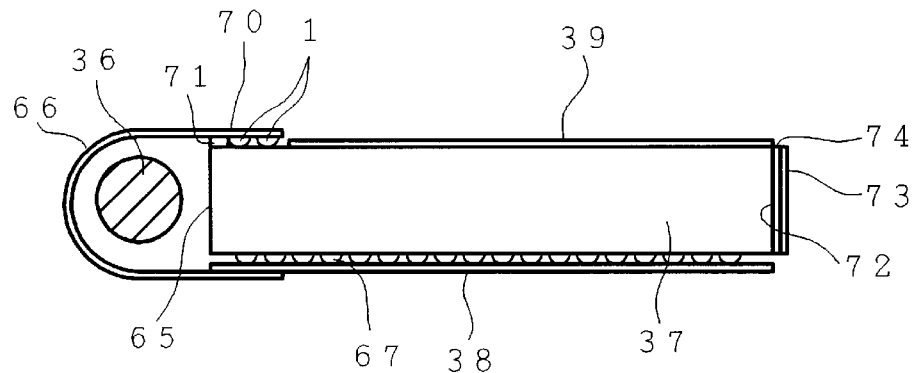
FIG. 2 is a side view of a back light according to a second embodiment of the present invention.

FIG. 2 is a side view of a back light according to a second embodiment of the present invention.

According to the arrangement shown in FIG. 2, the section 1 printed with gray-colored dots, for example, is provided as a hue layer on the undersurface of the end portion 70 of the lamp reflector sheet 66 mounted on the surface of the light guide 37 adjacent the light-receiving edge face 65. Although the section 1 is provided at a place different from the place shown in FIG. 1A, light leakage on the screen near the fluorescent tube 36 can also be prevented as in the first embodiment. The rest of the construction is similar to that of FIG. 1.

Figure 3:
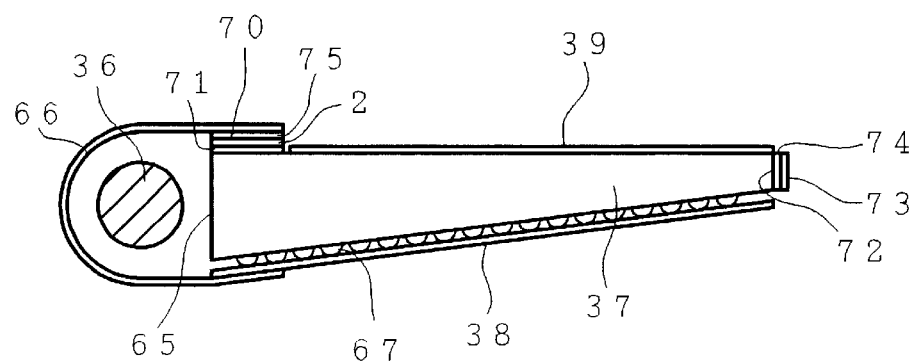
FIG. 3 is a side view of a back light according to a third embodiment of the present invention.

FIG. 3 is a side view of a back light according to a third embodiment of the present invention.

According to the arrangement of FIG. 3, a gray-colored tape 2, for example, is pasted via an adhesive layer 75 on the undersurface of the end portion 70 of the lamp reflector sheet 66 mounted on the surface of the light guide 37 adjacent the light-receiving edge face 65. The colored dots are provided as a hue layer to prevent light leakage according to the first and second embodiments, whereas the colored tape 2 is used as a hue layer instead according to the third embodiment. Consequently, light leakage on the screen can also be prevented as in the first or second embodiment. In this case, at least the side, that is, the undersurface of the light guide 37 needs coloring; however, the colored undersurface and colored surface or the tape having the colored interior may be employed. Although the light guide 37 according to the first or second embodiment is in the form of a flat plate (cuboid), a wedge-shaped (trapezoidal in cross section) light guide 37 is used in the third embodiment. The rest of the construction is similar to that of the first or second embodiment. Incidentally, the colored tape 2 is adhesion-bonded via the adhesive layer 71 to the surface of the light guide 37.

Figure 4:
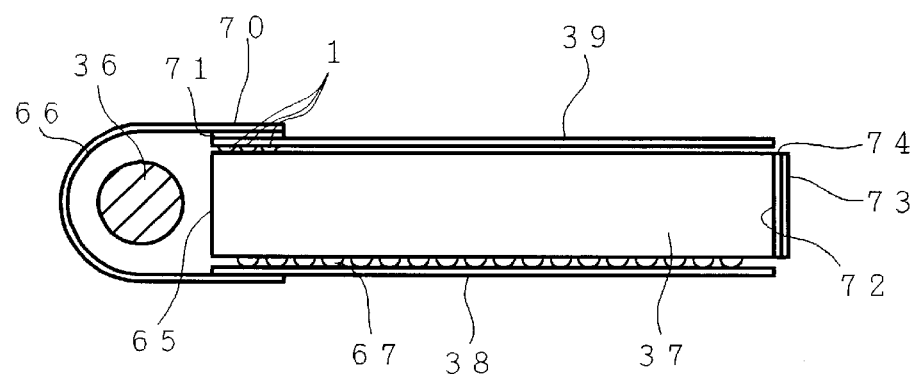
FIG. 4 is a side view of a back light according to a fourth embodiment of the present invention.

FIG. 4 is a side view of a back light according to a fourth embodiment of the present invention.

According to the arrangement of FIG. 4, the section 1 printed with gray-colored dots, for example, is provided on the undersurface of the diffusion sheet 39 adjacent the light-receiving edge face 65. Although the section 1 colored dots for preventing light leakage is provided on the undersurface of the lamp reflector sheet 66 above the light guide 37 according to the second embodiment of FIG. 2, the hue layer is provided on the undersurface of the diffusion sheet 39 according to the fourth embodiment. Therefore, light leakage can be prevented as in any one of the aforementioned embodiments of the present invention. Incidentally, the end portion 70 of the lamp reflector sheet 66 is adhesion-bonded via the adhesive layer 71 to the surface of the diffusion sheet 39. The rest of the construction is similar to that of the second embodiment of FIG. 2.

Figure 5:
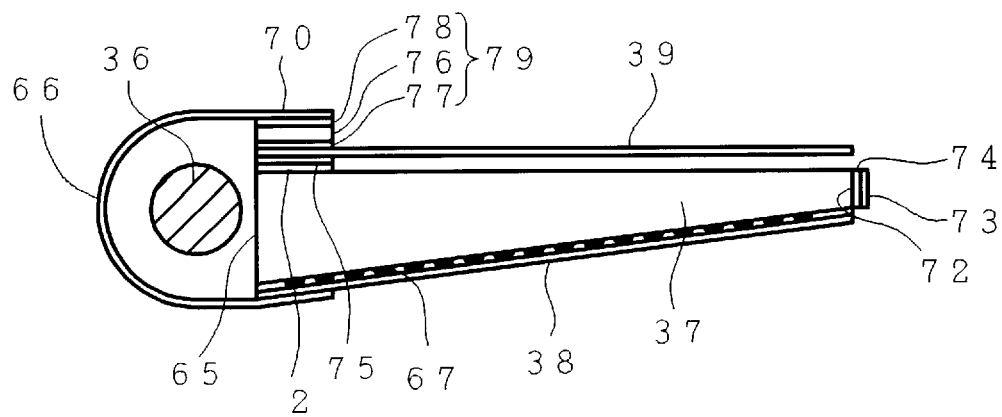
FIG. 5 is a side view of a back light according to a fifth embodiment of the present invention.

FIG. 5 is a side view of a back light according to the fifth embodiment of the present invention.

According to the fifth embodiment, a gray-colored tape 2, for example, serving as a hue layer, is pasted via the adhesive layer 75 on the undersurface of the diffusion sheet 39 on the end thereof adjacent the light-receiving edge face 65 of the wedge-shaped light guide 37. Therefore, light leakage can be prevented as in any one of the aforementioned embodiments of the present invention. Incidentally, the end portion 70 of the lamp reflector sheet 66 is adhesion-bonded onto the surface of the diffusion sheet 39 via a double-sided tape 79 including an adhesive layer 78, a base layer 76 and an adhesive layer 77. The rest of the construction is similar to that of the third embodiment of FIG. 3.

According to the embodiments 1–5 of the present invention, the effect of preventing the light-leakage remains unchanged in either case whether a hue layer in the form of the colored dots or the colored tape is provided on the upper or lower side of the light guide 37.

A description will subsequently be given of a simple matrix type liquid crystal display unit to which the present invention is applicable in reference to FIGS. 1–5 as the embodiments 1–5 of the present invention.

Figure 6:
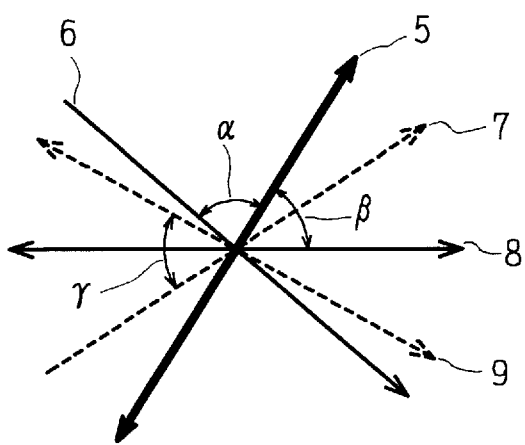
FIG. 6 is a diagram illustrating the relation among the directions in which liquid crystal molecules are arranged and deflected, the axial directions of polarization plates, and the optical axis of a birefringence member in a single matrix type liquid crystal display to which the present invention is applicable.
Figure 7:
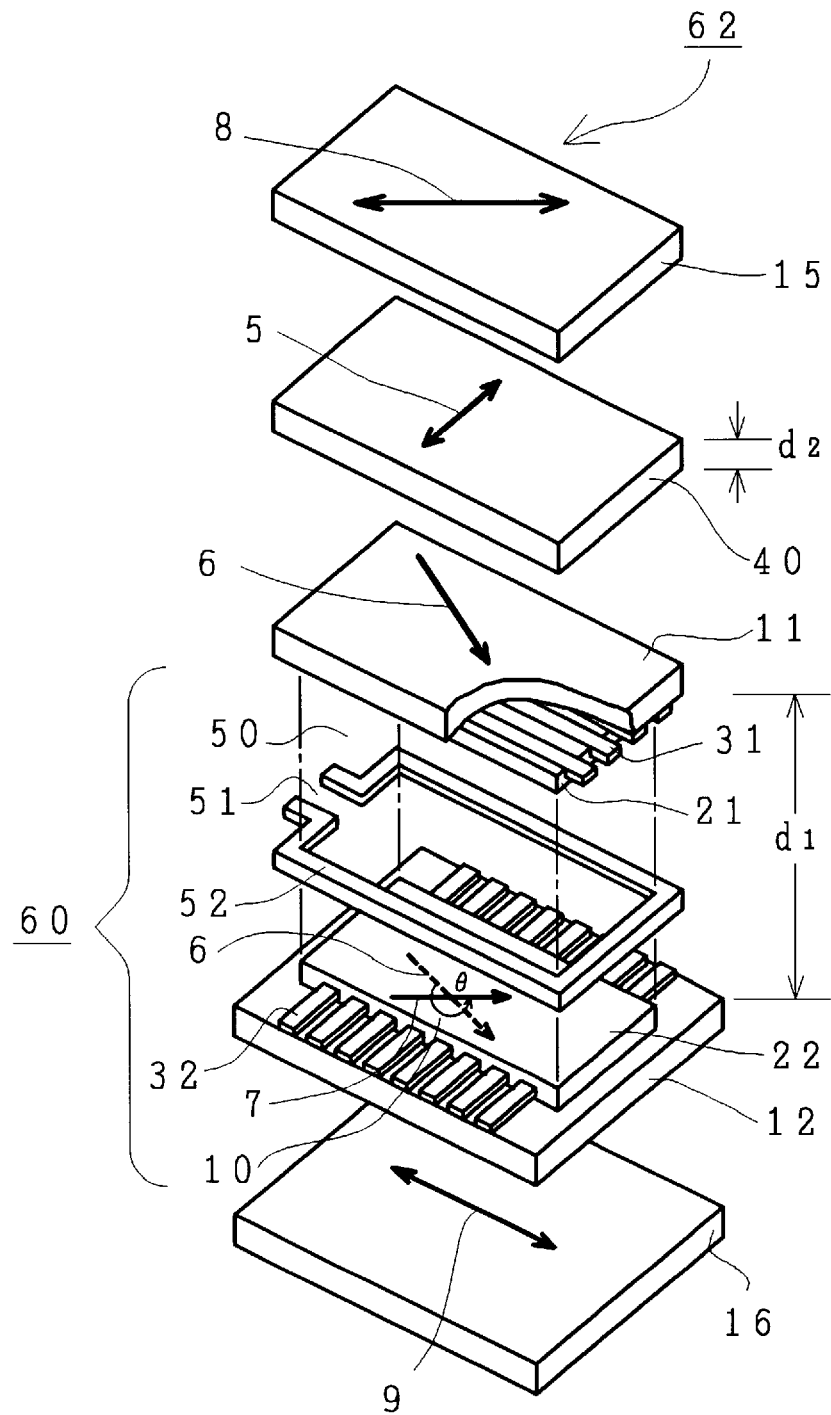
FIG. 7 is an exploded perspective view of the principal part of an exemplary liquid crystal display.

FIG. 6 shows the directions in which liquid crystal molecules are arranged (e.g., rubbing direction) and deflected, the polarizing (absorbing) axial directions of polarization plates, and the optical axis of a member which brings about the birefringence effect on the electrode substrate as viewed from the upper side of the liquid crystal display 62 of the liquid crystal display unit to which the present invention is applicable, and FIG. 7 is an exploded perspective view of the principal part of the liquid crystal display 62.

The direction 10 in which the liquid crystal molecules are deflected and the angle of deflection are regulated by the rubbing direction 6 of an orientation film 21 on an upper electrode substrate 11, the rubbing direction 7 of an orientation film 22 on a lower electrode substrate 12, the kind and quantity of a photo-substance to be added to a nematic liquid crystal layer 50, which is held between the upper and lower electrode substrates 11, 12 and has a positive dielectric anisotropy.

In order to orientate the liquid crystal molecules of twisted spiral structure between the upper and lower electrode substrates 11, 12 for holding the liquid crystal layer 50 therebetween, there has been adopted a so-called rubbing technique, that is, the technique of unidirectionally rubbing, with, for example, a cloth, the surfaces of the orientation films 21, 22 of organic polymeric resin, such as polyimide in contact with the liquid crystal on, for example, upper and lower transparent glass electrode substrates 11, 12. Then, the rubbing direction 6 in the case of the upper electrode substrate 11 and the rubbing direction 7 in the case of the lower electrode substrate 12 become the directions in which the liquid crystal molecules are arranged. The upper and lower electrode substrates 11, 12 thus orientated are made to face each other with a gap d1 therebetween so as to make their rubbing directions 6, 7 intersect at substantially 180° to 360°. A frame-shaped sealing member 52 provided with a cutout (a liquid crystal sealing port) 51 for injecting liquid crystals is then used for adhesion-bonding the electrode substrates 11, 12. When nematic liquid crystals having a positive dielectric anisotropy and containing a predetermined quantity of a photo-substance are sealed in the gap thus formed, the liquid crystal molecules are so arranged that a spiral structure having an angle of deflection is created between the electrode substrates. Reference numerals 31, 32 denote transparent upper and lower electrodes of, for example, indium oxide or ITO (Indium Tin Oxide), respectively. A member 40 which brings about the birefringent effect (hereinafter called the birefringent member, see "Phase Difference Film for STN-LCD," by Fujimura et al., Electronic Material, pp 37–41, February, 1991) is placed on the upper electrode substrate 11 of a liquid crystal cell 60 thus constructed. Further, upper and lower polarization plates 15, 16 are formed with the member 40 and the liquid crystal cell 60.

An adoptable angle of deflection of liquid crystal molecules in the liquid crystal layer 50 may range from 180° to 360°, preferably from 200° to 300°, and more preferably from 230° to 270° from a practical standpoint in that the light-on state near the threshold value of a transmittance-applied voltage curve is restrained from inducing a phenomenon of light scattering orientation so as to maintain excellent time sharing properties. The conditions basically make the response of liquid crystal molecules more sensitive to the voltage and produce excellent time sharing properties. In order to obtain a good display quality, the product n1×d1 of the refractive index anisotropy n1 of the liquid crystal layer and the thickness d1 thereof may range preferably from 0.5 $\mu$m to 1.0 $\mu$m, and more preferably from 0.6 $\mu$m to 0.9 $\mu$m.

The birefringent member 40 functions to modulate the polarized condition of light which has passed through the liquid crystal cell 60 and is used to convert the colored display produced by the liquid crystal cell 60 as a simple substance to a black-and-white display. For this reason, the product $\Delta n2 \cdot d2$ of the refractive index anisotropy $\Delta n2$ of the liquid crystal layer and the thickness d2 thereof is extremely important and preferably is set to a range from 0.4 $\mu$m to 0.8 $\mu$m, and more preferably from 0.5 $\mu$m to 0.7 $\mu$m.

As the liquid crystal display 62 makes use of elliptic polarization of light due to birefringence, considerable importance is attached to the relation among the axes of the polarization plates 15, 16, the optical axis of a uniaxial transparent birefringent plate when this plate is used as the birefringent member 40, and the directions in which the liquid crystals of the electrode substrates 11, 12 of the liquid crystal cell 60 are oriented.

Referring to FIG. 6, the function and effect of the above relation will be described. FIG. 6 shows the relation among the axes of the polarization plates, the optical axis of the uniaxial transparent birefringent member, and the directions in which the liquid crystal molecules of the electrode substrates of the liquid crystal cell are oriented, as viewed from above the liquid crystal display constructed as shown in FIG. 7.

In FIG. 7, reference numeral 5 denotes the optical axis of the uniaxial transparent birefringent member 40; 6 denotes the direction in which the liquid crystal molecules of the upper electrode substrate 11 adjacent to the birefringent member 40 are arranged; 7 denotes the direction in which the liquid crystal molecules of the lower electrode substrate 12 are arranged; 8 denotes the absorbing or polarizing axis of the upper polarization plate 15; and 9 denotes the absorbing or polarizing axis of the lower polarization plate 16. Further, reference character α represents the angle between the direction 6 in which the liquid crystal molecules of the upper electrode substrate 11 are oriented and the optical axis 5 of the uniaxial birefringent member 40; β represents the angle between the absorbing or polarizing axis 8 of the upper polarization plate 15 and the optical axis 5 of the uniaxial transparent birefringent member 40; and the angle γ represents the angle between the absorbing or polarizing axis 9 of the lower polarization plate 16 and the direction 7 in which the liquid crystal molecules of the lower electrode substrate 12 are arranged.

Figure 11A:
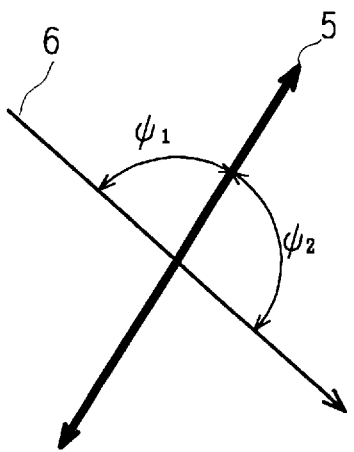
FIGS. 11A and 11B are diagrams illustrating the way in which crossing angles α, β and γ are measured.
Figure 11B:
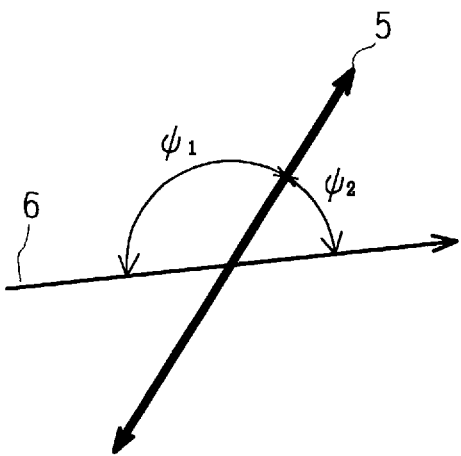

The method of measuring the angles α, β and γ represents the angle in the present specification will be defined. In FIG. 11A and 11B, a description will be given of the measuring method by taking the intersectional angle between the optical axis 5 of the birefringent member 40 and the direction 6 in which the liquid crystal molecules of the upper electrode substrate are oriented as an example. The intersectional angle between the optical axis 5 and the direction 6 in which the liquid crystal molecules are arranged can be expressed by φ1 and φ2, as shown in FIG. 11A and 11B. The smaller one of φ1 and φ2 will be adopted in the present specification. Since φ1<φ2 in FIG. 11A, the intersectional angle φ1 between the optical axis 5 and the direction 6 in which the liquid crystal molecules are arranged is defined α, whereas since φ1<φ2 in FIG. 11B, the intersectional angle φ2 between the optical axis 5 and the direction 6 in which the liquid crystal molecules are arranged is defined as α. When φ1=φ2, either one may needless to say be taken.

The angles α, β and γ are extremely important in the case of such a liquid crystal display.

The angle α may be set at preferably 50°–90° and more preferably 70°–90°, the angle α at preferably 20°–70° and more preferably 30°–60°, and the angle γ at preferably 0°–70°, and more preferably 0°–50°.

As long as the angle of deflection of the liquid crystal layer 50 of the liquid crystal cell 60 is within the range of 180° to 360°, the angles α, β, γ may be within the above range even though a deflection is caused in either clockwise or counterclockwise direction.

Although the birefringent member 40 is placed between the upper polarization plate 15 and the upper electrode substrate 11 in FIG. 7, it may be located between the lower electrode substrate 12 and the lower polarization plate 16. In this case, the overall arrangement is equivalent to an arrangement which has been set upside down.

Figure 8:
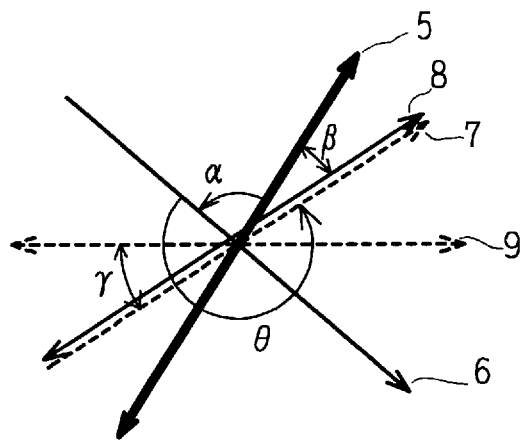
FIG. 8 is a diagram illustrating the relation among the directions in which liquid crystal molecules are deflected, the axial directions of polarization plates, and the optical axis of a birefringence member in another example of a liquid crystal display.

FIG. 8 shows a specific example of the angle Θ of deflection. As shown in FIG. 8, the angle of deflection of liquid crystal molecules is 240°, and as the uniaxial birefringent member 40, use is made of a parallel-orientated (homogeneously-orientated) liquid crystal cell, that is, having a 0° angle of deflection. The ratio d/p of the thickness d (μm) of the liquid crystal layer to the spiral pitch p (μm) of the liquid crystal material containing the photo-substance is set to 0.67.

The orientation films 21, 22 are formed of polyimide resin films before being subjected to the rubbing process. A pretilt angle of 4° is used to make the orientation film, subjected to the rubbing process, tiltly orientate liquid crystal molecules in contact with the orientation film against the substrate plane Δn2·d2 of the above uniaxial transparent birefringent member 40 at approximately 0.6 μm. On the other hand, Δn1·d1 of the liquid crystal layer 50 containing liquid crystal molecules of 240° deflected construction is approximately 0.8 μm.

At this time, the angles α, β, γ are set to about 90°, 30°, 30°, respectively. When the voltage applied via the upper and lower electrodes 31, 32 to the liquid crystal layer 50 is less than the threshold value, no light is transmitted, which results in black, and when the voltage exceeds a certain threshold value, light is transmitted, which results in white; in other words, a black-and-white display then becomes possible. In a case where the axis of the lower polarization plate 16 is turned by 50° to 90° from the aforementioned position, moreover, white results when the voltage applied to the liquid crystal layer 50 and black results when the voltage exceeds the threshold value, so that a white-and-black display becomes possible.

Figure 9:
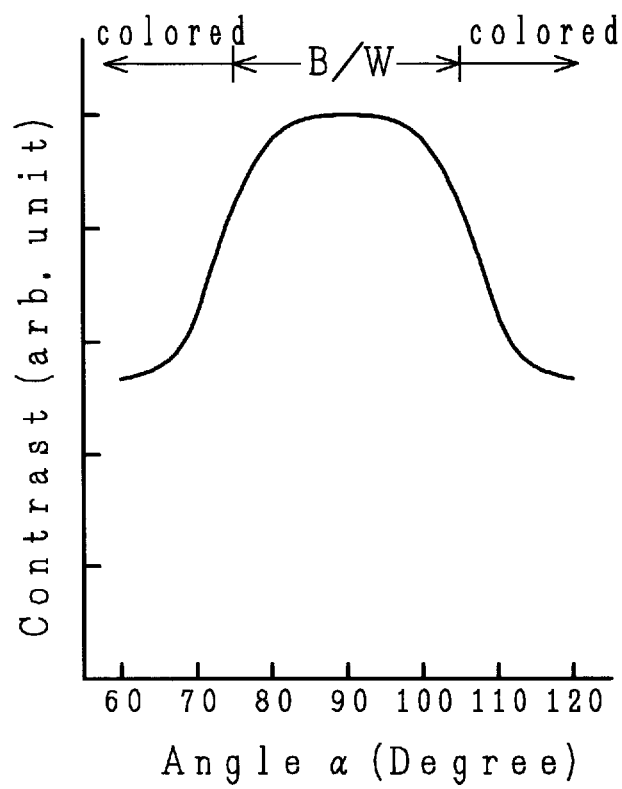
FIG. 9 is a graphic representation showing contrast and transmitted light color—crossing angle α characteristics of the liquid crystal display of FIG. 7.

FIG. 9 shows a variation in contrast at the time of a time-sharing operation with a duty ratio of 1/200 when the angle α is varied with the arrangement of FIG. 8. Although extremely high contrast is exhibited while the angle α remains in the vicinity of 90°, it is lowered as the angle shifts therefrom. When the angle α becomes smaller, moreover, the light-on and light-off sections becomes bluish, and as the angle α increases, the light-off section turns purple, whereas the light-on section turns yellow, whereby a black-and-white display is not attainable. Similar results are obtained from the angles α, and in the case of the angles β and γ, an inverted black-and-white display appears when the angle γ is turned by 50° to 90° as stated above.

FIG. 8 shows another specific example of the angle Θ of deflection. The basic arrangement is similar to what is shown in FIG. 8. What makes this example different includes the following: the angle of deflection of the liquid crystal molecules of the liquid crystal layer 50 is 260° and Δn1·d1 ranges from about 0.65 μm–0.75 μm. The product Δn2·d2 of a parallel orientation liquid crystal layer for use as the uniaxial transparent birefringent member 40 is about 0.58 μm as in the aforementioned specific example. The ratio of the thickness of the liquid crystal layer to the spiral pitch p (μm) of the nematic liquid crystal material containing the photo-material is set to d/p=0.72.

At this time, the angles α, β, γ are respectively set to about 100°, 35°, 15° so that a black-and-white display similar to that in the initial example can be attained. Further, an inverted black-and-white display is also possible by turning the position of the axis of the lower polarization plate by 50° to 90° from the aforementioned value used in the initial example. The tendency in the shifting of the angles α, β, γ is substantially similar to those in the initial example.

In any one of the specific examples described above, a parallel orientation liquid crystal cell free from the deflection of liquid crystal molecules has been used as the uniaxial transparent birefringent members 40. However, variations in color originating from the angles are lowered when use is made of liquid crystal layers whose liquid crystal molecules are deflected by about 20° to 60°. Like the aforementioned liquid crystal layer 50, the liquid crystal layer thus deflected is formed by holding liquid crystals between the substrates such that the directions in which the pair of transparent substrates subjected to the orientation process are orientated intersect each other at a predetermined angle of deflection. In this case, the direction of one of the two exact halves of an included angle in the two orientation directions holding the deflecting structure of the liquid crystal molecules may be treated as the optical axis of the birefringent member. Moreover, a transparent polymeric film (preferably a uniaxially stretched one) may be used as the birefringent member 40. In this case, PET (Polyethylene, terephthalate), acrylic plastic film and polycarbonate are effectively usable for the polymeric film.

Although the birefringent member has been a simple substance in the preceding examples, it is acceptable to insert one additional sheet of birefringent member in between the lower electrode substrate 12 and the lower polarization plate 16. In this case, Δn2·d2 of these birefringent members may be readjusted.

Figure 10:
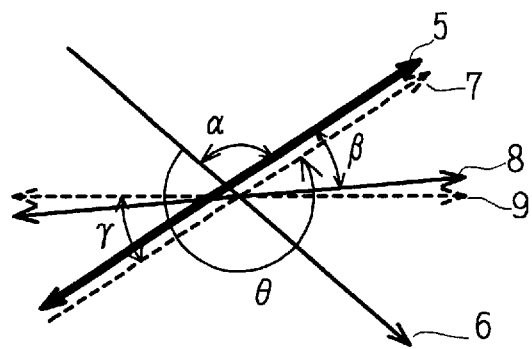
FIG. 10 is a diagram illustrating the relation among the directions in which liquid crystal molecules are arranged and deflected, the axial directions of polarization plates, and the optical axis of a birefringent member in still another example of a liquid crystal display.
Figure 12:
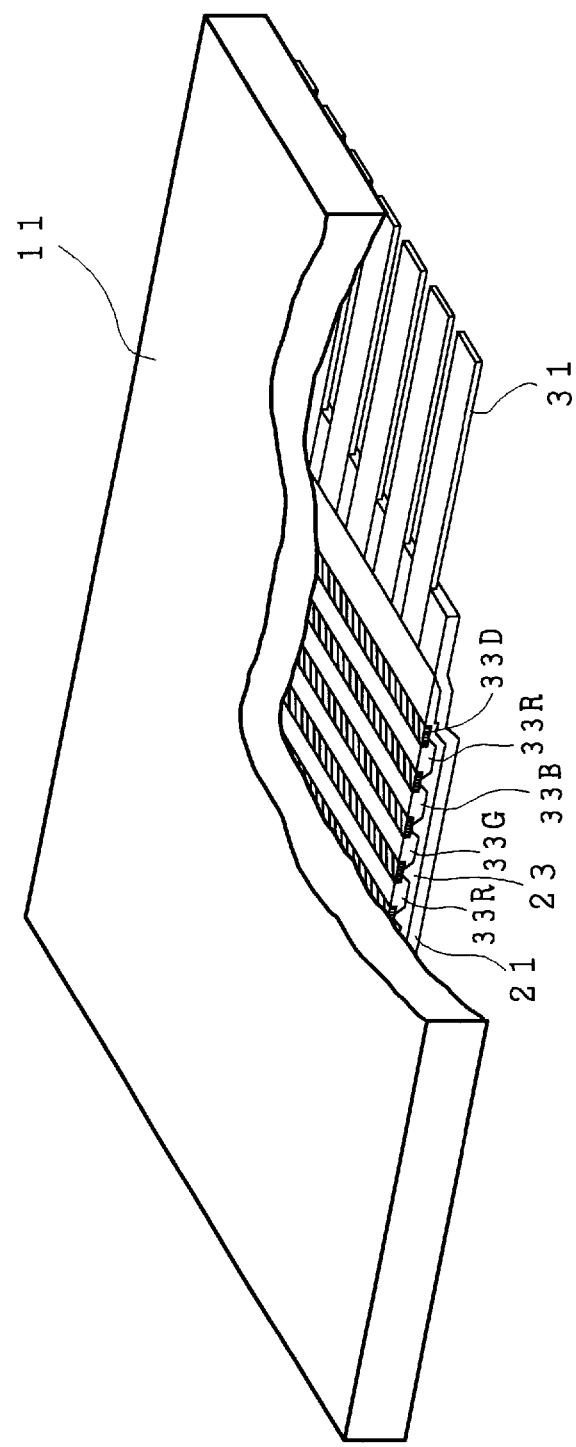
FIG. 12 is a partial cutaway perspective view of an example of an upper electrode substrate of a color liquid crystal display.

As shown in FIG. 12, further, a multicolor display is made possible by providing red, green, blue color filters 33R, 33G, 33B on the upper electrode substrate 11, and light shielding films 33D between the filters. FIG. 10 shows the relation among the directions in which the liquid crystal molecules are arranged and deflected, the axial direction of the polarization plates, and the optical axis of the birefringent member in the aforementioned specific example.

In FIG. 12, an insulating smoothing film 23 for reducing the influence of ruggedness is formed on the filters 33R, 33G, 33B and the shielding films 33D, and the orientation film 21 as well as the upper electrode 31 are formed thereon.

Figure 13:
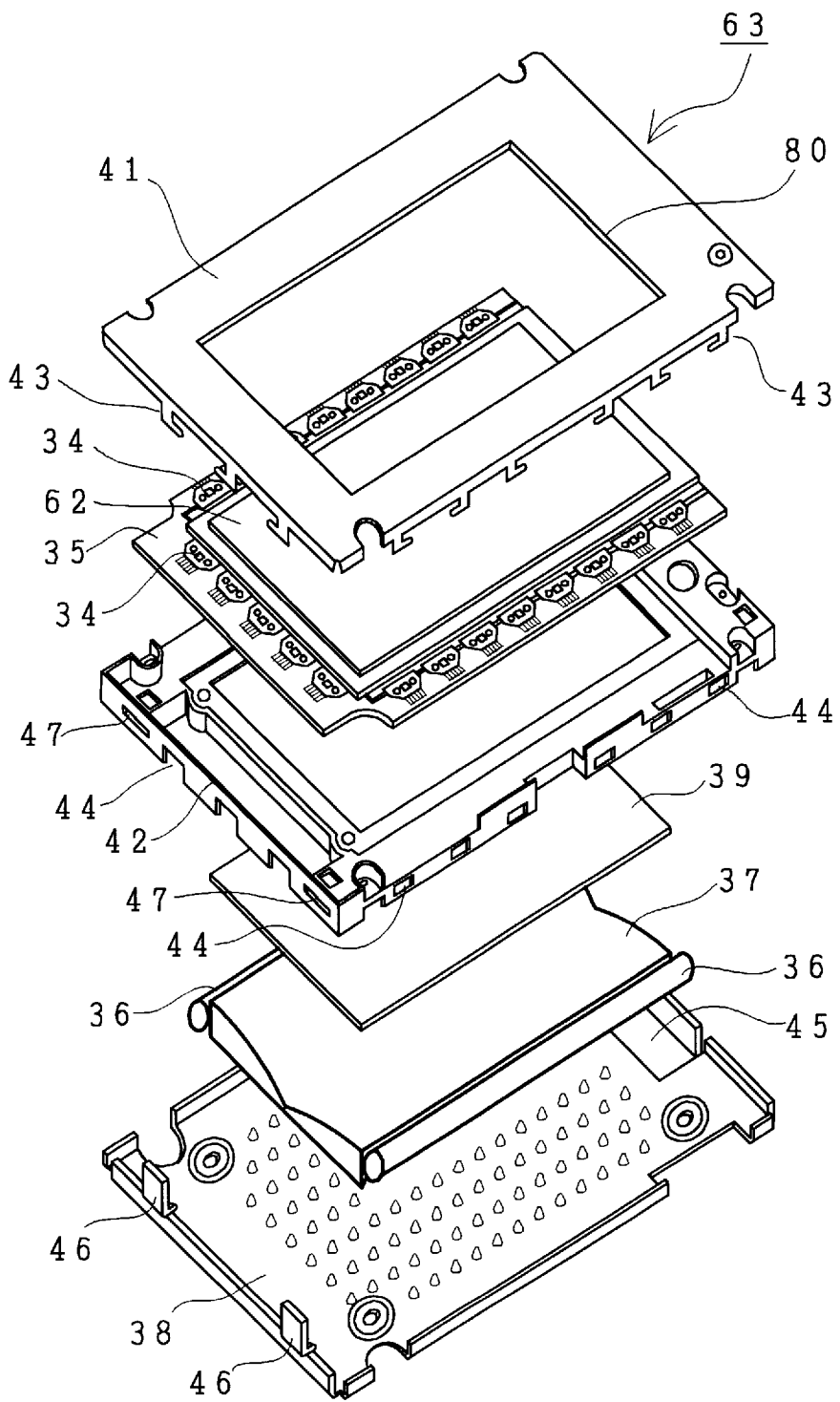
FIG. 13 is an exploded perspective view of an example of a liquid crystal display module.

FIG. 13 is an exploded perspective view of an exemplary compact liquid crystal display module 63 including the integration of a driving circuit for driving the liquid crystal display 62 and a light source. An IC 34 for driving the liquid crystal display 62 is mounted on a frame-shaped printed board 35 having a window for fitting the liquid crystal display 62 at the center thereof. The printed board 35 with the liquid crystal display 62 is fitted in the window of a frame-shaped body 42 formed by plastic molding and a metal frame 41 is placed thereon, and pawls 43 are bent in the cutouts 44 formed in the frame-shaped body 42 to fix the frame 41 to the frame-shaped body 42.

The cold cathode fluorescent tubes 36, each placed at the upper and lower ends of the liquid crystal display 62, the light guide 37 formed of an acrylic plate for causing the liquid crystal 60 to be irradiated uniformly with light from the cold cathode fluorescent tubes 36, the reflective sheet 38 formed by coating a metal plate with white paint, and the diffusion plate 39 of, for example, opal polycarbonate for diffusing light from the light guide 37 are fitted into the window from the back of the frame-shaped body 42 in the order indicated in FIG. 13. An inverter power supply circuit (not shown) for lighting the cold cathode fluorescent tube 36 is accommodated in a recess (not shown, located opposite to the recess 45 of the reflective sheet 38) provided in the right-hand back of the frame-shaped body 42. The diffusion plate 39, the light guide 37, the cold cathode fluorescent tubes 36 and the reflective sheet 38 are fixed by bending tongue pieces 46 provided for the reflective sheet 38 each in small holes 47 bored in the frame-shaped body 42.

Light leakage on the screen near the light source can also be prevented by utilizing the hue layer according to the first to fifth embodiments of the present invention as indicated in FIGS. 1 to 5, though illustration thereof has been omitted in FIG. 13. Since the two cold cathode fluorescent tubes 36 are each arranged along the two opposite sides of the light guide 37 in the liquid crystal display module 63, as shown in FIG. 13, moreover, measures should be taken to counter light leakage at both of the cold cathode fluorescent tubes 36.

Figure 14:
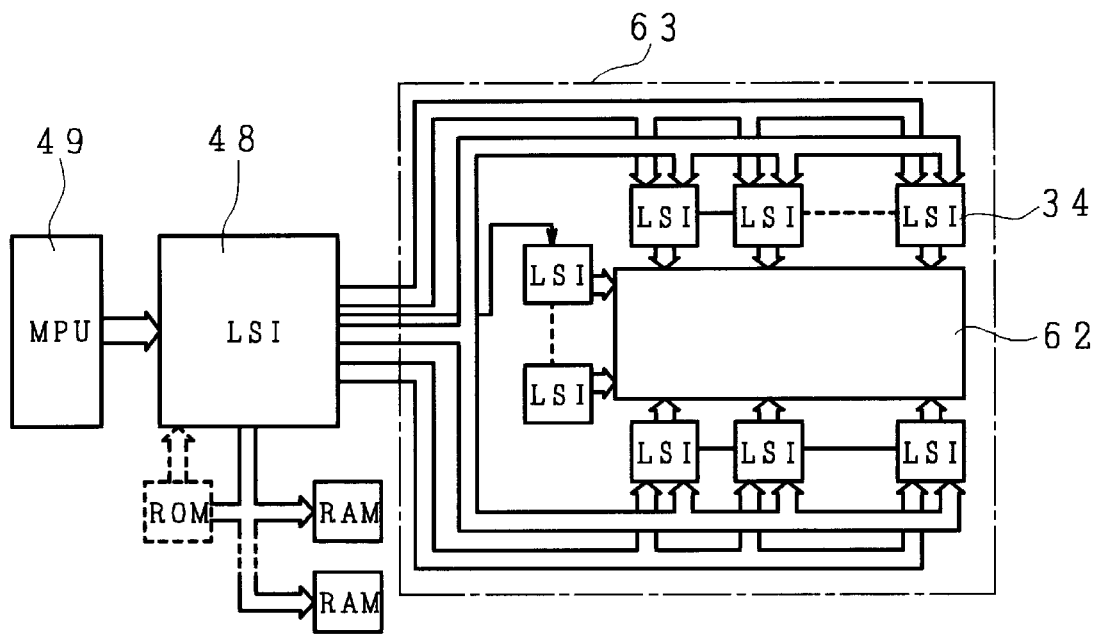
FIG. 14 is a block diagram of an example of a laptop personal computer.
Figure 15:
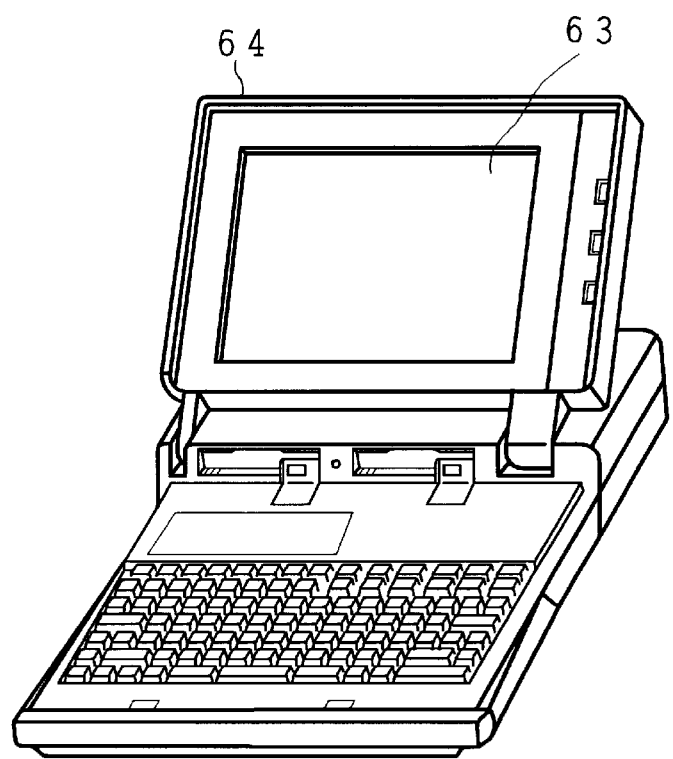
FIG. 15 is a perspective view of an example of a laptop personal computer.

FIG. 14 is a block diagram of a laptop personal computer in which the liquid crystal display module 63 is used for its display unit, and FIG. 15 a view of a laptop personal computer with the liquid crystal display module 63 packaged therein. In the laptop personal computer 64, a microprocessor 49 is used to drive the liquid crystal display module 63 via a control LSI 148 by means of a liquid crystal driving semiconductor IC 34.

As set forth above, a field-effect liquid crystal display which has excellent time sharing driving properties and is capable of white-and-black and multicolor display can thus be attained as demonstrated by the specific examples.

A description will subsequently be given of an active matrix type liquid crystal display to which the present invention is applicable, as exemplified by the first to fifth embodiments of FIGS. 1 to 5.

Figure 16:
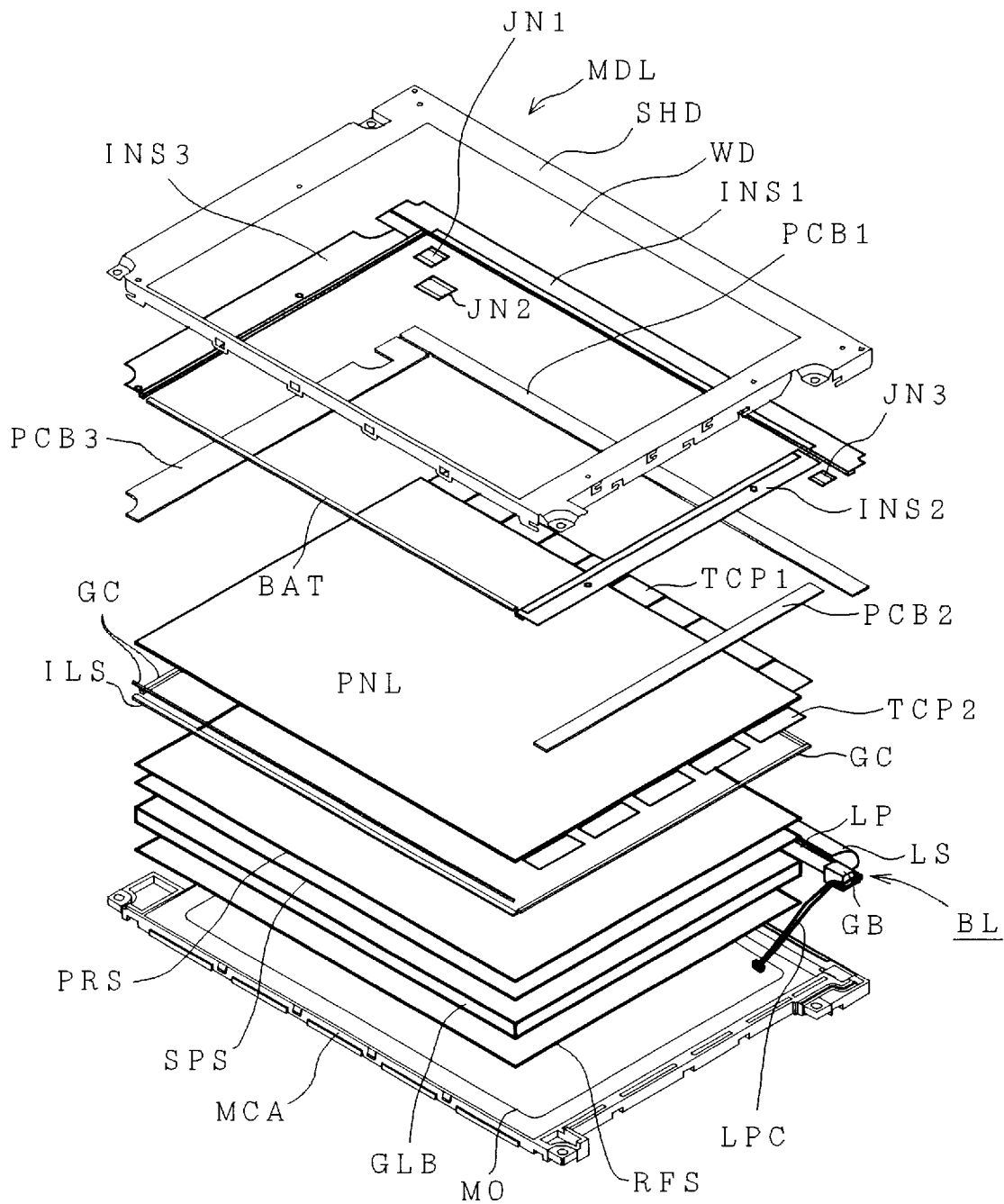
FIG. 16 is an exploded perspective view of an active matrix type liquid crystal display module to which the present invention is applicable.
Figure 17A:
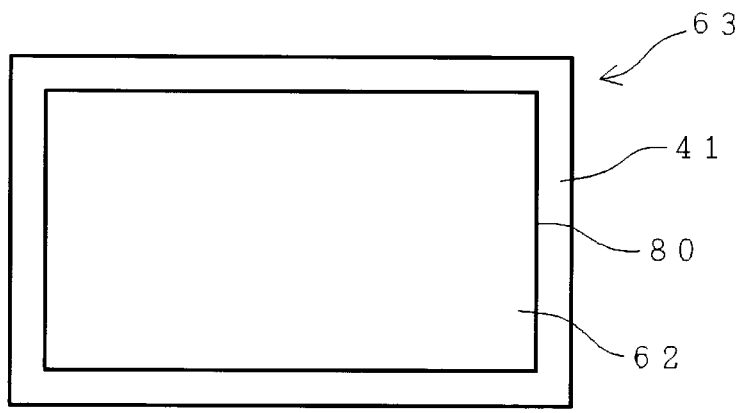
FIG. 17A is a top view of a conventional liquid crystal display module.
Figure 17B:
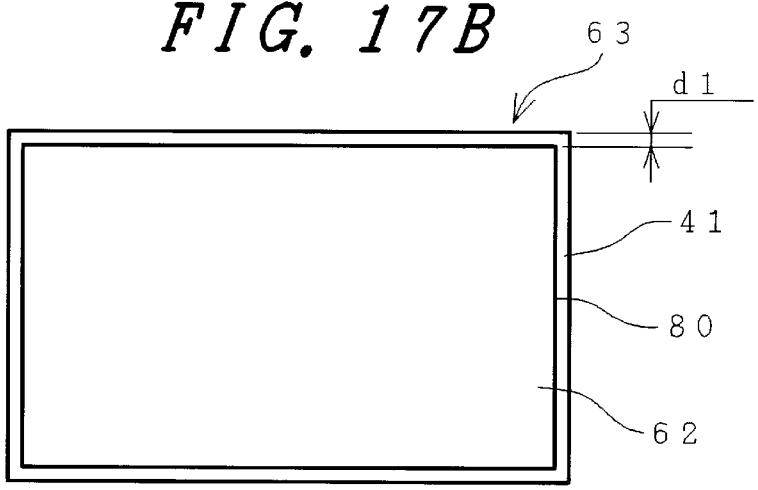
FIG. 17B is a top view of the latest liquid crystal display module.

FIG. 16 is an exploded perspective view of component parts of a liquid crystal display module MDL.

In FIG. 16, SHD represents a shielding case (also called a metal frame) formed of a metal plate; WD denotes a display window; INS1–3 denotes insulating sheets; PCB 1–3 denotes circuit boards (PCB1 denotes a circuit board on the drain side; PCB2, a circuit board on the gate side; and PCB3, an interface circuit board); JN denotes a joiner for electrically connecting the respective circuit boards PCB1–3; TCP1, TCP2 denotes tape carrier packages; PNL denotes a liquid crystal display panel; GC denotes a rubber cushion; ILS denotes a light-shielding spacer; PRS denotes a prism sheet; SPS denotes a diffusion sheet; GLB denotes a light guide plate; RFS denotes a reflective sheet; MCA denotes a lower case (molded case) formed by integral molding; LP denotes a fluorescent tube; LPC denotes a lamp cable; and an GB denotes a rubber bush for supporting the fluorescent tube LP, these members being stacked up in the vertical positional relationship as shown in FIG. 16 and assembled into the liquid crystal display module MDL.

The liquid crystal display module MDL is provided with two kinds of members for accommodating and holding the lower case MCA and the shielding case SHD. The module MDL is assembled by combining the metal shielding case SHD for accommodating and securing the insulating sheets INS1–3, the circuit boards PCB 1–3 and the liquid crystal display panel PNL with the lower case MCA for accommodating a back light BL including the fluorescent tube LP, the light guide plate GLB, the prism sheet PRS and the like.

Light leakage on the screen near the light source can also be prevented by employing the first to fifth embodiments of the present invention as indicated in FIGS. 1 to 5, though illustration thereof has been omitted in FIG. 16.

Although a detailed description has been given of the invention by reference to the embodiments thereof, the present invention is not restricted to the embodiments thereof, but may be modified in various ways without departing from the scope and spirit of the invention. According to the first to fifth embodiments of the invention as shown in FIGS. 1 to 5, for example, the end portion 70 of the lamp reflector 66 is adhesion-bonded onto the light guide 37 or the surface of diffusion plate 39 by means of the adhesive layer 71 or the double-sided tape 79, whereas the other end portion of the lamp reflector 66 is held down with a frame or the like without adhesion-bonding it; however, such an arrangement is not essential. In other words, the end portion 70 of the lamp reflector 66 may be, for example, held down with the frame or a molded frame-like body, whereas the other end of the lamp reflector 66 may be adhesion-bonded via the adhesive layer onto the reflective sheet 38 or the undersurface of the light guide 37. The diffusion sheet 39 may be a diffusion plate, and the diffusion sheet 39 may be combined with a reflective plate, a frame or the like. Although the section 1 having a hue layer printed with colored dots thus arranged is provided according to Embodiment 1, 2 or 4 of FIG. 1A,1B, 2 or 4, the dots may, needless to say, be configured or arranged in a manner other than what is shown in FIG. 1A. In accordance with the condition and intensity of light leakage, the configuration, size, orientation, color tone, and color density of the dot pattern in the section printed with colored dots are controlled and optimized. Moreover, the intended effect of the invention may be achievable likewise other than by use of such a dot pattern, such as by use of color printing instead. Further, gray, dark brown, purple, green, black and the like are usable for the colored tape in the color-printed section.

As set forth above, the display quality is improved by effectively preventing light leakage on the screen near a back light source in a simple manner with an arrangement which is also advantageous for providing a compact liquid crystal display unit which is also lightweight, according to the present invention.

We claim:

1. A liquid crystal display device having side edge type back light system, comprising:

a liquid crystal display panel;

a light guide disposed under said liquid crystal display panel;

a diffusion sheet disposed between said light guide and said liquid crystal display panel;

a fluorescent tube disposed close to and along at least one side of said light guide;

a lamp reflector sheet for covering substantially the whole length of the fluorescent tube, end portion of said lamp reflector overlapping with end portion of said light guide and an end portion of said diffusion sheet; and a reflective sheet disposed under said light guide, wherein an undersurface of said diffusion sheet adjacent said one side of said light guide is provided via an adhesive layer with a colored tape at least on said light guide side.

2. A liquid crystal display device according to claim 1, wherein said colored tape is disposed only in the overlapping region of said end portion of said lamp reflector and said end portion of said light guide.

3. A liquid crystal display device according to claim 1, wherein a color of said colored tape is one of gray, dark brown, purple, green and black.

4. A liquid crystal display device according to claim 1, wherein said colored tape prevents light leakage.

5. A liquid crystal display device having a side edge type back light system, comprising:
- a liquid crystal display panel;
- a light guide disposed under said liquid crystal display panel;
- a diffusion sheet disposed between said light guide and said liquid crystal display panel;
- a fluorescent tube disposed close to and along at least one side of said light guide;
- a lamp reflector covering substantially the whole length of the fluorescent tube, an end portion of said lamp reflector overlapping with an end portion of said light guide and an end portion said diffusion sheet;
- a reflective sheet disposed under said light guide; and
- a light absorption layer disposed between said end portion of said diffusion sheet and said end portion of said light guide.

6. A liquid crystal display device having a side edge type back light system, comprising:
- a liquid crystal display panel;
- a light guide disposed under said liquid crystal display panel;
- a diffusion sheet disposed between said light guide and said liquid crystal display panel;
- a fluorescent tube disposed close to and along at least one side of said light guide;
- a reflective sheet disposed under said light guide, said reflective sheet having printed color dots arranged on upper surface of said reflective sheet for absorbing light from said fluorescent tube so that an area of said printed color dots is decreased in proportion to an increase in a distance from said fluorescent tube; and
- a lamp reflector covering substantially the whole length of the fluorescent tube, an end portion of said lamp reflector overlapping with an end portion of said light guide and an end portion of said reflective sheet.

7. A liquid crystal display device according to claim 6, wherein said color dots are linearly arranged in a plurality of rows substantially in parallel to the direction of a major axis of said fluorescent tube, and wherein each center point of said color dots arranged in one of said rows is substantially located at halfway between color dots arranged in an adjacent row of said one of said rows.

8. A liquid crystal display device according to claim 6, wherein a color of said color dots is one of gray, dark brown, purple and green.

9. A liquid crystal display device according to claim 6, wherein said color dots are printed on a region elongating in parallel to a major axis of said fluorescent tube and a width of said region is between 0.1 mm and 2 mm.

10. A liquid crystal display device according to claim 6, wherein said guide has a plurality of light diffusion dots underside of said light guide and an area of said area of said printed color dots overlaps an area of said light diffusion dots.

* * * * *